United States Patent [19]
Irvine

[11] 3,708,420
[45] Jan. 2, 1973

[54] CATALYST TRANSFER IN A PLURAL BED HYDROGENATION PROCESS

[76] Inventor: Robert Leard Irvine, Rob, Nes, Pyle Hill, Woking, Surrey, England

[22] Filed: Feb. 25, 1971

[21] Appl. No.: 118,697

[30] Foreign Application Priority Data

Feb. 27, 1970   Great Britain..........................9519/70

[52] U.S. Cl. ................208/156, 208/157, 208/213, 208/251 H, 23/1 FT, 23/288 S
[51] Int. Cl. ............................................C10g 23/06
[58] Field of Search....208/155, 156, 157, 251 H, 89; 23/1 FT

[56] References Cited

UNITED STATES PATENTS

| | | | |
|---|---|---|---|
| 2,520,983 | 9/1950 | Wilcox | 208/156 |
| 2,702,267 | 2/1955 | Keith | 208/156 |
| 2,731,394 | 1/1956 | Adams et al. | 208/155 |
| 3,607,725 | 9/1971 | Irvine | 208/251 H |

*Primary Examiner*—Herbert Levine
*Attorney*—Liberman

[57] ABSTRACT

The invention relates to a process for the hydrogenation of hydrocarbon feedstocks in a reactor comprising a number of catalyst beds through which fluidized catalyst descends in countercurrent to feed and hydrogen. The invention provides a catalyst transfer system whereby the catalyst is moved in batches from an upper to the next lower bed by an external catalyst transfer pipe provided with an inlet for hydrogen.

2 Claims, 1 Drawing Figure

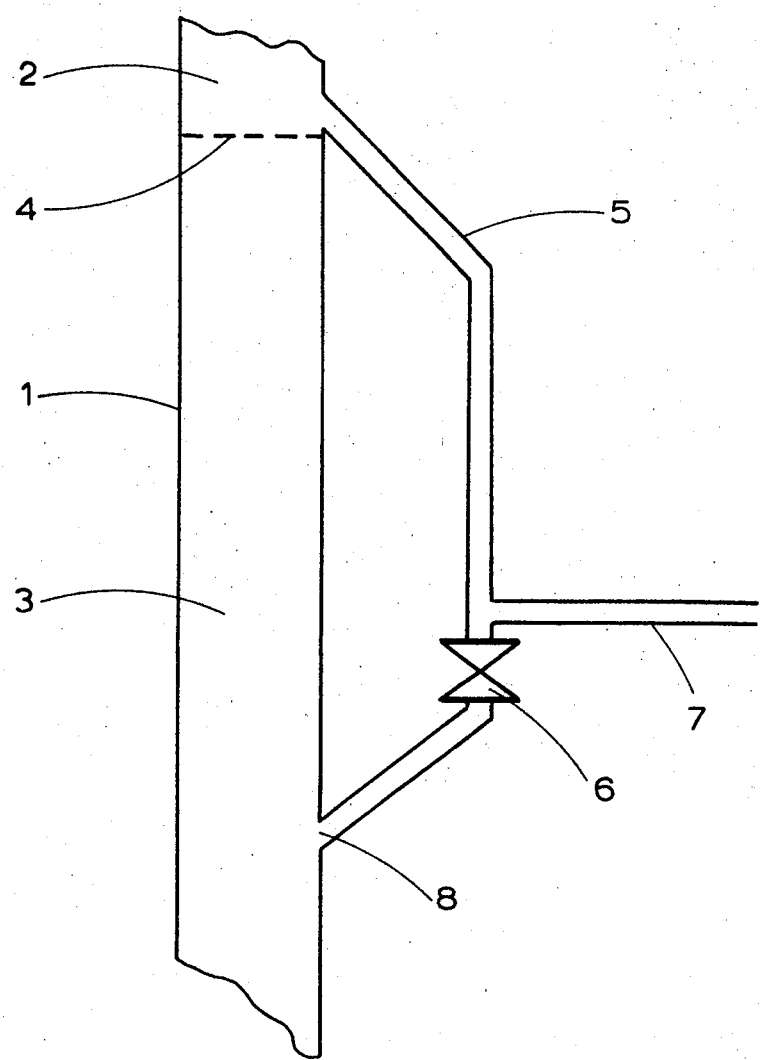

CATALYST TRANSFER IN A PLURAL BED HYDROGENATION PROCESS

This invention relates to a method and apparatus for catalyst handling in hydrogenation reactors.

My U.S. Application Serial No. 810,127 now U.S. Pat. No. 3,607,725 describes a process for the hydrogenation of non-hydrocarbons in crude or residua feed which comprises passing the crude or residua feed and make-up hydrogen through a metal removal reactor comprising a plurality of catalyst beds through which catalyst falls progressively from the top of the reactor to the bottom while crude or residua feed and hydrogen are fed upwardly through the catalyst beds in countercurrent to the catalyst flow and at a velocity to ensure fluidization of the catalyst.

I have now found in developing the application of the process principles to crudes or residua as disclosed in U.S. Application Ser. No. 810,127 that it is better to handle the catalyst in a stage as a batch, and to withdraw an entire batch in a stage before catalyst transfer between stages and addition.

Handling the catalyst transfer of an entire batch of catalyst in a stage overcomes the disadvantage of fluidization which, with partial withdrawal and addition, corresponds in that the catalyst being withdrawn contains an equilibrium mixture which contains catalyst which has been previously added only a short period before as well as catalyst which has been resident a longer period than the average because of the thorough mixing of the solid catalyst particles of fluidization.

The number of stages is selected so that the catalyst transfer cycle period is reasonable and the change in effluent products composition between the withdrawal of a batch of spent catalyst, catalyst transfer between stages and addition of a conditioned fresh batch of make-up catalyst is commercially tolerable.

The nature of the hydrogenation reactions assist in minimizing the product change as the greater the extent of hydrogenation the less the effect of an incremental volume of catalyst. For example, for a metal removal section accomplishing at least 88 per cent desulfurization, 24 stages would represent a practical selection as this number would correspond to less than 1 per cent change in product composition between the end of a previous cycle and the commencement of a new cycle with fresh catalyst. Batching instead of partial withdrawal with multi-stages also assists in lining out or achieving steady state equilibrium operations. It is particularly of assistance at the final stages in order to ensure higher activity catalyst corresponding to shorter residence time contacting the least active reactant. The catalyst transfer cycle period would be governed by overall space velocity requirements which is dependent upon the feed characteristics and operating pressure chosen.

The distribution plate for a stage is relatively inexpensive as, unlike fixed beds, its standing design load is greater than its operating dynamic loading, and no allowance need be made for increased pressure drag because of depositing, fouling or plugging as in fixed beds as packing cannot occur under upflow conditions. It has been found that the stages chosen for batch withdrawal also are economical in that the cost of the distribution plates are more than offset by the increased efficiency in the use of the catalyst. By enabling a low hydrogen circulation rate throughout the reactor, a smaller diameter may be used throughout.

Catalyst transfer between stages is readily effected by an apparatus as shown in the accompanying drawing which shows diagrammatically the system used for catalyst transfer according to the present invention.

Referring now to the drawing the metal removal reactor is shown diagrammatically in part as 1, the section shown having an upper bed 2 and a lower bed 3 separated by distributor plate 4. Catalyst is withdrawn from upper bed 2 by way of catalyst standpipe 5 provided with catalyst transfer valve 6. Provision is made for interstage hydrogen injection through line 7. Catalyst enters lower bed 3 by way of inlet 8. Pipe 5 can be provided with cold quench injection for heat removal.

The interstage hydrogen admitted per stage generally is less than 6 per cent of the hydrogen consumption. Therefore, the hydrogen injected to a stage may be shut off during catalyst transfer without significantly affecting the hydrogen available for accomplishing the desired reaction. The external catalyst transfer pipe serves as a convenient point to inject the interstage hydrogen because of its limited amount and because the fluidization will accomplish its mixing with other reactants in the stage. The hydrogen injected also serves as an aeration medium so that bridging in the catalyst transfer pipe is avoided as well as preventing any stagnant area without hydrogen present which could result in increased coke deposition.

The catalyst transfer valve is relatively simple mechanically as discrete catalyst particles are employed (generally larger than 0.6 millimeter diameter) and the valve has a low differential pressure, and it is unnecessary to have a bubble tight seal between catalyst transfer.

The catalyst withdrawal at the base of the reactor must be bubble tight and withdrawing the entire batch before closing aids in the operation of this valve.

By transferring an entire batch of catalyst, the closing of the catalyst transfer valve and the catalyst withdrawal valve at the base of a reactor is facililated.

The selection of stages results in economically sized catalyst addition and transfer vessels. The catalyst transfer piping is relatively small compared to the reactor diameter, even though this reactor diameter corresponds under normal cases to a cross sectional feed throughout of at least 1.5 times as much as the best of commercial practice to date.

Having the catalyst transfer pipes external of the reactor itself does not interfere with a uniform flow pattern within the reactor and the fluid-solid disengaging of the lower reactor stage and affords easy accessibility to the valves whose temperature is lower than the reactor itself which assists in valve life and maintenance.

Mechanical handling of catalyst is practical because of the relatively large hydrocarbon feed mass treated per unit mass of catalyst which must be handled. For example, the metal removal catalyst make-up rate typically corresponds for treating residua from Middle Eastern crudes to using a fresh catalyst make-up rate equivalent to 1 pound of catalyst per 4,000 pounds of residua treated. In this respect, the hydrogenation process differs from moving bed and fluidized bed catalytic cracking wherein the catalyst sensible heat provides for the endothermic reaction heat required and the mass of catalyst transferred approximates to that of the hydrocarbon feed.

It has also been found that it is more advantageous to use a letdown flash gas for accomplishing the sulfiding of the batch of addition catalyst as the increased hydrogen sulfide content is more desirable for sulfiding the addition batch of catalyst, and its increased hydrocarbon content more effectively presaturates the catalyst and, thereby, further minimizes any heat of wetting upon introduction into the reactor. This sulfiding treatment may be conveniently carried out in the catalyst addition vessel with only minor modifications to facilitate this treatment.

What I claim is:

1. A process for the hydrogenation of nonhydrocarbons in crude or residua feed which comprises passing the crude or residua feed and hydrogen through a metal removal reactor comprising a plurality of catalyst beds through which catalyst falls progressively from the top of the reactor to the bottom while the crude or residua feed is fed upwardly through the catalyst beds in countercurrent to the catalyst flow at a velocity sufficient to maintain said descending catalyst in a fluidized state and passing the crude or residua hydrocarbon from the metal removal reactor to a separator stage, the temperatures and pressures of said crude or residua feed and said hydrogen being within the ranges to effect the hydrogenation of said non-hydrocarbons in the presence of said catalysts and wherein catalyst transfer between beds is effected externally of the reactor by way of a transfer pipe having an outlet from the lower portion of one bed and an inlet to the next lower bed, said pipe being provided with a valve adapted to close the pipe and an inlet for interstage hydrogen injection.

2. A process as claimed in claim 1 wherein the catalyst transfer pipe is provided with cold quench injection for heat removal.

* * * * *